(12) United States Patent
Müller et al.

(10) Patent No.: US 7,963,586 B2
(45) Date of Patent: Jun. 21, 2011

(54) INTERIOR WALL PANEL FOR A MOTOR VEHICLE

(75) Inventors: Henry Müller, Landshut (DE); Peter Geisperger, Taufkirchen/Vils (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 393 days.

(21) Appl. No.: 11/500,589

(22) Filed: Aug. 8, 2006

(65) Prior Publication Data

US 2007/0036946 A1 Feb. 15, 2007

(30) Foreign Application Priority Data

Aug. 11, 2005 (DE) .................. 10 2005 038 082

(51) Int. Cl.
 *B60R 21/04* (2006.01)
(52) U.S. Cl. .............. 296/146.7; 296/1.08; 296/1.09; 296/153
(58) Field of Classification Search ............. 296/39.1, 296/1.08, 1.09, 146.7, 153; 297/411.21
See application file for complete search history.

(56) References Cited

U.S. PATENT DOCUMENTS

| | | | |
|---|---|---|---|
| 4,779,390 A | | 10/1988 | Repper et al. |
| 4,919,470 A | * | 4/1990 | Muller .......................... 296/153 |
| 5,462,786 A | * | 10/1995 | Van Ert .......................... 428/171 |
| 5,658,046 A | * | 8/1997 | Rus .............................. 297/378.1 |
| 6,185,872 B1 | * | 2/2001 | Seeberger et al. ............... 49/502 |
| 6,248,205 B1 | * | 6/2001 | Scheidmantel et al. ... 156/309.6 |
| 7,059,658 B2 | * | 6/2006 | Ziegler et al. ............... 296/146.7 |
| 7,070,221 B2 | * | 7/2006 | Cowelchuk et al. ......... 296/39.1 |
| 7,104,590 B2 | * | 9/2006 | Dooley et al. ................. 296/153 |
| 7,367,103 B2 | * | 5/2008 | Schoemann et al. ......... 29/527.1 |
| 7,806,450 B2 | * | 10/2010 | Johnson et al. ............... 296/1.08 |
| 2004/0100120 A1 | * | 5/2004 | Ziegler et al. ............... 296/146.7 |
| 2005/0046075 A1 | | 3/2005 | Youngs et al. |
| 2006/0147697 A1 | * | 7/2006 | Medina-Galarza et al. .......................... 428/314.4 |

FOREIGN PATENT DOCUMENTS

| | | |
|---|---|---|
| DE | 8307414.7 | 10/1985 |
| DE | 4343240 A1 | 6/1995 |
| DE | 102004041384 A1 | 6/2005 |
| EP | 0990561 B1 | 4/2000 |
| WO | WO 2005/039857 | 5/2005 |

* cited by examiner

*Primary Examiner* — Glenn Dayoan
*Assistant Examiner* — Pinel E Romain
(74) *Attorney, Agent, or Firm* — Wolf, Greenfield & Sacks, P.C.

(57) ABSTRACT

Aspects of the invention relate to a panel for a vehicle interior. The panel includes a relatively non-deformable support having at least one shaped portion, and a relatively deformable inlay pad that can be mounted in the shaped portion. The inlay pad may be formed as a foam pad, as an air cushion and/or as a gel cushion. Aspects of the invention also relate to a method for forming a panel for a vehicle interior.

28 Claims, 2 Drawing Sheets

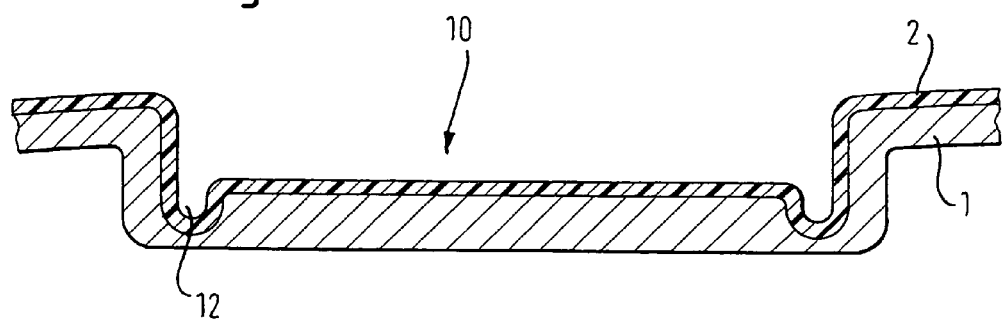
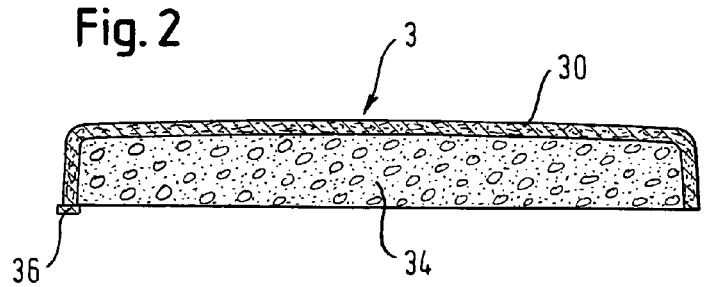
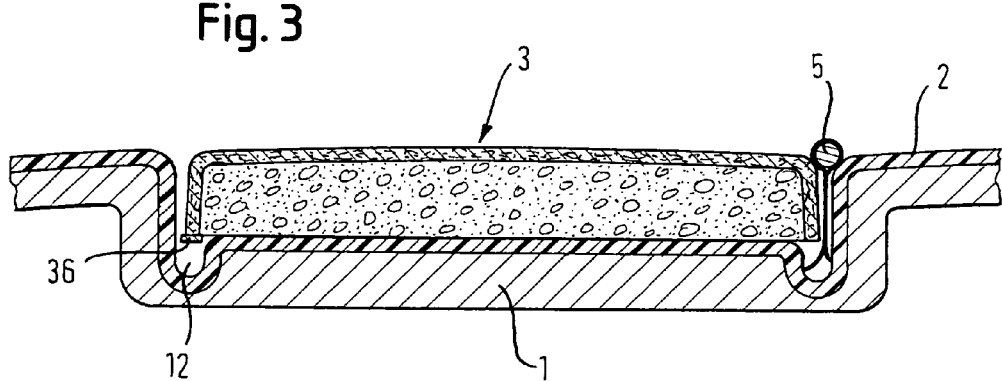

INTERIOR WALL PANEL FOR A MOTOR VEHICLE

FIELD

Aspects of the invention relate to a panel for a wall in a vehicle interior, and more particularly to a panel with regions that include a soft or deformable area.

DISCUSSION OF RELATED ART

Panels for an interior wall of a vehicle, such as an interior door panel, usually comprise a firm non-deformable support and a decorative sheet that covers the support and faces the vehicle interior. In some methods, the sheet is applied to the support as a coating. In other methods, the sheet is placed in a tool and then the support is formed about the sheet by way of injection molding, injection compression molding or an extrusion deposition process. According to some methods, the sheet is formed by a deep-drawing method. In some known methods, the support is formed behind a deep-drawn sheet through a long-fiber injection (LFI) technique, by inserting a glass mat and/or by introducing a suitable polyurethane (PU) system in an open or closed filling technique. In the above described methods, the resulting panels are typically hard and non-deformable.

Panels with soft regions are also known. These panels are made by partially foaming the support, such as in the region of a complete door rail. The support is then coated with a sheet. In other methods used to form panels with soft regions, the support is foamed together with the sheet. However, foaming can only be carried out over large regions in each of the above techniques used to form panels with soft regions. Consequently, it is only possible to produce soft regions over the entire length of the support, such as the entire vehicle door. Such methods also result in high manufacturing costs.

There is a need for panels that can include soft regions at any desired location and that can be manufactured in a cost effective manner.

SUMMARY

According to one embodiment, a panel for a vehicle interior is disclosed. The panel comprises a relatively non-deformable support formed with at least one shaped portion and a relatively deformable inlay pad configured to be mounted in the shaped portion.

According to another embodiment of the invention, a method is disclosed for forming a panel for a vehicle interior. The method comprises providing a relatively non-deformable support formed with a shaped portion and forming a relatively deformable inlay pad into a shape that corresponds to the shaped portion. The method also comprises mounting the deformable inlay pad into the shaped portion to form the panel.

According to another embodiment, a panel for a vehicle interior is disclosed. The panel comprises a relatively non-deformable support. The support defines a pad mounting surface. A relatively deformable pad is mounted to the pad mounting surface.

Various embodiments of the present invention provide certain advantages. Not all embodiments of the invention share the same advantages and those that do may not share them under all circumstances.

Further features and advantages of the present invention, as well as the structure of various embodiments of the present invention are described in detail below with reference to the accompanying drawings.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. Various embodiments of the invention will now be described, by way of example, with reference to the accompanying drawings, in which:

FIG. 1 is a schematic representation of a panel with a shaped portion;

FIG. 2 is a schematic representation of a first embodiment of an inlay pad;

FIG. 3 is a schematic representation of the inlay pad according to FIG. 2 in a mounted state;

DETAILED DESCRIPTION

Figure 4:
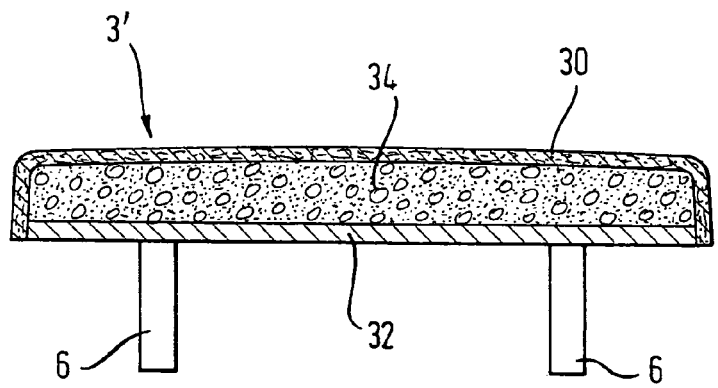
FIG. 4 shows a second embodiment of the inlay pad.

Vehicles often include individual panels that line portions of the vehicle interior. In some areas of the vehicle interior, it may be desirable to have soft, deformable regions to provide comfort to the occupant of the vehicle. One of such areas is an arm rest, often located on an interior door panel of a vehicle. Present methods used to form such soft, deformable areas are not amenable to doing so in a cost effective manner, and/or are incapable of forming soft, deformable regions of shapes and sizes required by some vehicle interiors.

Embodiments of the present invention relate to a panel for use in a vehicle interior that comprises a firm support that has a shaped portion. A separate, soft deformable inlay pad may be mounted into the shaped portion to form a panel with soft, deformable regions. Aspects of the invention also relate to methods of producing panels for vehicle interiors.

Turn now to the figures, and initially FIG. 1, which shows in schematic form a panel comprising a support 1 and a sheet 2. The support 1 comprises a substantially firm, non-deformable material. As shown, the support 1 and the sheet 2 are formed with a shaped portion 10 that is configured to receive an inlay part, such as a foam pad. As such, the support is relatively non-deformable or rigid whereas the pad is relatively deformable and cushioning.

The combination of the support 1 and the sheet 2 can be produced through various techniques. According to one embodiment, the support and sheet are formed through rear-injection or rear embossing of the sheet 2. Still, according to other embodiments, the support and sheet are formed by coating the support 1 with the sheet 2. It is to be appreciated that the support may include still other embodiments, as aspects of the invention are not limited to that shown in FIG. 1, and that other methods may be used to form the shaped portion 10.

The shaped portion and inlay pad may be formed in various different size so that various size soft regions may be formed to accommodate the needs of different vehicle designs. By way of example, larger shaped portions and inlay pads maybe used in vehicle interiors that require larger soft regions. Similarly, greater numbers of shaped portions and inlay pads may be formed in panels to be used in vehicles that require greater numbers of soft regions.

The shape and overall configuration of the inlay pad and corresponding support portion may take on different forms to suit the needs of a particular vehicle design. The size and/or the shape of the shaped portion are/is to be appropriately selected according to the place of use. By way of example, in one embodiment the shaped portion maybe be trough-shaped, and a corresponding inlay pad may be inserted into the trough. Moreover, although the support portion is shown as a recess, in another embodiment, the support portion may comprise a projection or even a flat area on which the inlay pad is mounted, as the present invention is not limited in this respect.

In one illustrative embodiment, the panel comprises a sheet joined to the support such that the sheet faces the interior of the vehicle. In such an embodiment, the shaped portion may be formed in both the support and the sheet. The sheet can be chosen from a wide variety of materials, such that the support can be adapted visually and/or haptically to meet the requirements of different vehicle interior designs and/or required load-bearing capacities.

The sheet may be formed from different types of materials. In some illustrative embodiments, the sheet can be formed from TPO (thermoplastic polyolefin), PU (polyurethane), PVC (polyvinyl chloride) or ASA (polyacrylonitrile-styrene-acrylate). The sheet may be formed through various techniques as well. By way of example, in some embodiments the sheet may be formed as a mold skin, such as a PU spray skin, a PU cast skin, a slush, or an IMC (in-mold coating) slush. In one embodiment to produce a PU spray skin, PU is prayed into a mold, reacted and subsequently removed from the mold. For a slush process embodiment, a mold is filled with powder. The powder is sintered in the mold until a defined material quantity is obtained. The sintered material is heated to approximately 2400C and fused in the mold. In an IMC slush embodiment, a lacquer is first sprayed into a mold. Such an approach may be advantageous as a thin layer of lacquer may be sufficient to influence the nature of the mold skin, which may be desired in some applications. For example UV resistance, visual effects and/or the haptic effect of the overall system may be influenced as desired with such a thin layer. The above described approaches for producing the mold skin and therefore the panel can reduce manufacturing costs. Moreover, the material which is slushed behind the lacquer may be a cheaper material (e.g. aromatic PU). These factors, among others, can reduce the overall cost of the panel to be produced. Other suitable processes may be employed, as the present invention is not limited in this regard.

Various methods may be used to attach the sheet to the support, as the present invention is not limited in this regard. In one approach, the support is coated with the sheet. Some approaches include rear injecting or rear-embossing the sheet with the support. Such approaches can allow coating the support with the sheet either before forming the shaped portion or after forming the shaped portion. In some embodiments it may be preferable for the shaped portion to be present in the embossing or injection mold before rear-injecting or rear-embossing the sheet. With such approaches, it is possible to produce the support with a suitable shaped portion inexpensively by means of suitable tools.

In some embodiments, the support of the panel is coated with a sheet before mounting the deformable inlay pad. Here, the support may be coated over its entire area such that coating can therefore be carried out inexpensively. Such coating can be performed both before the shaped portion is formed and after the shaped portion is formed.

FIG. 2 shows an illustrative embodiment of an inlay pad 3 that may be mounted into the shaped portion 10 of the support 1 to form a panel with deformable regions. The inlay pad may comprise a foam pad 34 and a decoration 30 that lies on a surface of the inlay pad. The inlay pad 3 may have an offset 36 at one edge that results from manufacturing inaccuracies. Recesses 12 can be formed into the shaped portion 10 to accommodate such offsets when the inlay pad 3 is mounted thereto. In this regard, the offset 36 may not adversely impact the quality of the assembled panel.

According to some embodiments, the inlay pad may be formed as a foam pad and may be formed from materials like PU, PE (polyethylene), PP (polypropylene), TPE (thermoplastic elastomer), and the like. Additionally, the inlay pad may be formed as an air cushion and/or as a gel cushion. In this regard, the elasticity and/or the deformability of the inlay pad may be influenced by the choice of material. Aspects of the present invention also allow the production of the inlay pad to be independent of the production and/or the material of the support. As discussion herein, this may allow the inlay pad to be elastically deformable, unlike the support. However, it is to be appreciated that the invention is not limited in this regard, and that other embodiments are also possible, depending on the use of the inlay pad. The pad may be formed with one or more padding materials and may be formed with one or more layers as the present invention is not limited in this regard.

The surface of the inlay pad may be positioned in various ways with respect to the panel. In some embodiments, the inlay pad may form a flush panel surface. However, in other embodiments, the inlay pad may be set back with respect to other portions of the panel, or may even protrude beyond adjacent surfaces of the panel. Characteristics of the surface of the inlay pad that faces the vehicle interior may also be configured as desired for various applications.

In some embodiments, the inlay pad may be formed with a decoration. The decoration enables the inlay pad to be adapted to visual and/or haptic requirements of the passenger compartment of a vehicle. Such decorations can also be used to alter the susceptibility of the inlay pad to soiling, light sensitivity, temperature sensitivity and/or water sensitivity. In some embodiments, the decoration includes a textile, a non-woven fabric, imitation leather, leather or other suitable materials. In some embodiments, the inlay pad may be glued to the decoration, however, other suitable methods for joining the inlay pad and the decoration are also contemplated by the present invention.

In some embodiments, it may be beneficial to coat the inlay pad with a sheet after it has been mounted in the support portion. Here, the inlay pad may be adapted to visual and/or haptic requirements of the vehicle interior and the coating of the inlay pad may be visually and/or haptically adapted to a sheet of the panel.

FIG. 3 shows the inlay pad embodiment of FIG. 2 mounted to the panel embodiment of FIG. 1. As shown, the inlay pad 3 and the sheet 2 provide a flush surface that faces the interior of the vehicle, although in other embodiments, the inlay pad 3 maybe recessed or raised with respect to the sheet 2, as discussed herein. A wedge-shaped formation of the inlay pad is also possible in other embodiments, as aspects of the invention are not limited to the illustrated configuration.

The shaped portion 10 may include recesses 12 that coincide with edges of an inlay pad, as shown in FIG. 1 and FIG. 3. Such recesses may enable manufacturing inaccuracies, such as offsets at an edge of the inlay pad, to be compensated for in the assembled panel. In other embodiments, the recesses may serve other purposes, such as providing passageways for the installation of cables, light guides and/or other elements.

In some embodiments, the shaped portion and/or the inlay pad provide structural benefits to a vehicle interior. By way of example, the shaped portion may be formed as a reinforcing rib for the panel and/or the wall of the vehicle interior. Moreover, a deformable inlay pad may be used as an additional crash pad and/or damping element. However, it is to be appreciated that in many embodiments the inlay pad is not installed for the purpose of being a safety feature, but rather is present to improve comfort for the vehicle occupants during normal vehicle operation.

In some embodiments, panels with soft regions may be mounted in the area of a vehicle door. In such embodiments, the inlay pad may provide a comfortable region to be formed for the vehicle occupant to rest his/her arm.

As shown in FIG. 3, in some embodiments, the inlay pad 3 may be anchored in the shaped portion 10 by a mounting element 5. The mounting element 5 may be wedged between the shaped portion 10 and the inlay pad 3 on a side of the panel that faces the vehicle interior. In some embodiments, the mounting portion may comprise a chrome rim or other aesthetically pleasing design in order to satisfy visual requirements of the passenger compartment.

In some embodiments, the inlay pad may be mounted permanently in the shaped portion. Such permanent mounting may be accomplished by riveting, gluing, welding, or with other suitable techniques. The choice of a suitable joining method may depend, among other things, on material pairing of the inlay pad and the support or the inlay pad and the sheet. By way of example, a TPO sheet can be welded in a particularly suitable manner to a propylene foam.

In other embodiments, the inlay pad may be mounted in the shaped portion in a releasable manner. Such a releasable joint can be produced by threaded fasteners, clips, or by other suitable fasteners. In some embodiments it may be advantageous to be able to remove and replace the inlay pad, such as in embodiments that subject the deformable inlay pad more to wear than the non-deformable support and/or the sheet. Here, the inlay pad may be readily replaced at any time by mounting it in the shaped portion such that it can be released.

FIG. 4 shows a further illustrative embodiment of an inlay pad 3'. The inlay pad 3' comprises a support 32, in addition to the foam pad 34 and the decoration 30. As shown, the support 32 may be formed with welding domes 6 that can be used to fasten the inlay pad to the support. It is to be appreciated that other types of fasteners may also be used, as aspects of the present invention are not limited to that shown in FIG. 4. By way of example, in other embodiments, locking hooks, screws, adhesives, fastening clips, or other fasteners may be used to fasten the inlay pad to the support.

As shown in of FIG. 4, in some embodiments the inlay pad may be formed with a support element, and the inlay pad can be joined to the panel via the support element. In this case the material of the support element can be selected for a suitable welded, adhesive and/or screwed joint with the support, for example.

In some embodiments the inlay pad can be positively joined to the shaped portion. In one such embodiment, the inlay pad and/or the shaped portion may be formed with a trapezoidal cross-sectional shape.

Figure 5:
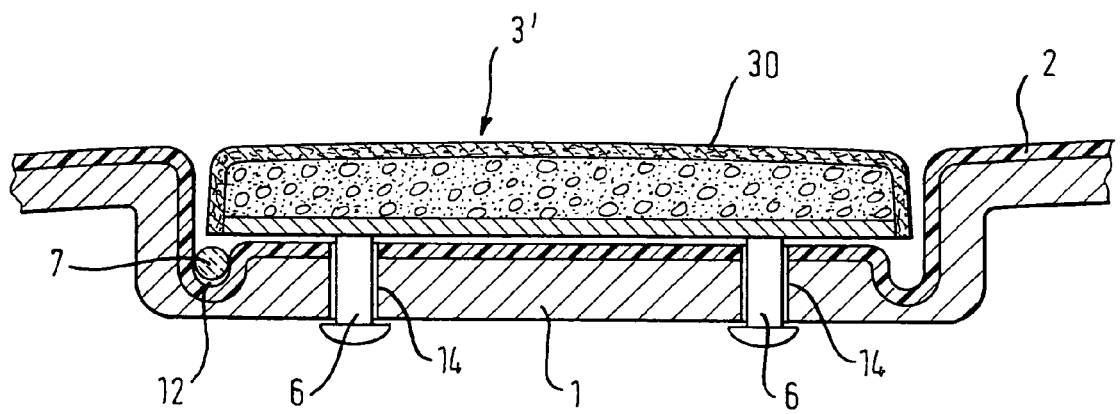
FIG. 5 is a schematic representation of the inlay pad according to FIG. 4 in a mounted state.

FIG. 5 shows the inlay pad 3' embodiment of FIG. 4 held in a shaped portion. As shown, the welding domes 6 are received in bores 14 of the support 1. The welding domes may be welded to a back surface of the support 1 to permanently join the inlay pad and the support. However, as discussed above, other fasteners may also be used to form either a permanent or a releasable joint between the inlay pad and the support, as the invention is not limited in this regard.

Welding domes can facilitate welding the inlay pad to the panel. With the use of welding domes, the inlay pad can be welded to the support of the panel at points. However, it is to be appreciated that flat welding is also possible, such as by producing a joint at the back of the support that may be accessed through bores formed in the support.

In some embodiments, the inlay pad may be formed with locking hooks that are used to mount the inlay pad to the shaped portion of the panel. Locking hooks enable the inlay pad to be automatically mounted in the shaped portion in an inexpensive and particularly simple manner.

According to some illustrative embodiments, the shaped portion 10 of a support 1 may include features that allow additional elements to be incorporated into the panel. By way of illustrative example, in some embodiments a fiber-optic light guide 7 may be inserted in the recess 12. In other embodiments, instrumentation for a climate control system, such as a temperature sensor or a temperature actuator, may be placed in the recess of the shaped portion 10. As shown in FIG. 5 and as discussed above, it is possible for the inlay pad 3' to be flush with the shaped portion 10. Alternately, it is possible for there to be a shallow gap between the panel and the inlay pad, or for the inlay pad to protrude from the panel, as aspects of the present invention are not limited in this regard.

In some embodiments, the inlay pad may be formed with a sensor and/or an actuator for a comfort setting. With such embodiments, it may be possible to receive a set a temperature from the inlay pad, or to control the temperature of the inlay pad to a given temperature. Additionally, the elasticity of some embodiments may be adapted elasticity by forming the inlay pad as a gel cushion. The comfort settings can then preferably be adapted to a certain vehicle driver.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the description and drawings herein are by way of example only.

What is claimed is:

1. A panel for a vehicle interior, the panel comprising:
a relatively non-deformable support defining a first portion of a vehicle interior side of the panel that is to be visible from the vehicle interior side, the support being preformed with at least one shaped recess portion that defines a footprint, the shaped recess portion including a recess at least at one edge region of the shaped recess portion; and
a relatively deformable inlay pad defining a second portion of the vehicle interior side of the panel, other than the first portion, and that is constructed separately from the support and that has a size and shape that correspond to the footprint such that the inlay pad itself substantially occupies the footprint of the shaped recess portion, the inlay pad including a foam pad, a decoration layer and an offset, the decoration layer overlying a first surface of the foam pad to be visible from the vehicle interior side, the offset being located below a second surface of the foam pad opposite the first surface, the recess accommodating the offset.

2. The panel according to claim 1, wherein the support includes a sheet joined to the support, the shaped recess portion being formed in the support and the sheet.

3. The panel according to claim 2, wherein the sheet is a decorative sheet, wherein the sheet is formed from a material chosen from at least one of thermoplastic polyolefin (TPO), polyurethane (PU), polyvinly chloride (PVC) or polyacrylonitril-styrene-acrylate (ASA), and further wherein the sheet is formed as a mould skin, a polyurethane spray skin, a polyurethane cast skin, a slush or as an in-mold coating (IMC) slush.

4. The panel according to claim 2, wherein the support is coated by the sheet or the sheet is rear-injected or rear-embossed with the support.

5. The panel according to claim 1, wherein the inlay pad is mounted permanently in the shaped recess portion.

6. The panel according to claim 1, wherein the inlay pad is mounted in the shaped recess portion in a releasable manner.

7. The panel according to claim 1, wherein the inlay pad is mounted in the shaped recess portion with an additional mounting element.

8. The panel according to claim 1, wherein the inlay pad is positively joined to the shaped recess portion and further wherein the shaped recess portion and the inlay pad are formed with a trapezoidal cross-section.

9. The panel according to claim 1, wherein the shaped recess portion is formed into the support as a reinforcing rib.

10. The panel according to claim 1, in combination with a vehicle door, wherein the panel is mounted to the vehicle door.

11. The panel according to claim 1, wherein the foam pad is made of polyurethane (PU), polyethylene (PE), polypropylene (PP), thermoplastic elastomer (TPE), as an air cushion, or as a gel cushion.

12. The panel according to claim 11, wherein the decoration includes a textile, a non-woven fabric, imitation leather or leather.

13. The panel according to claim 11, wherein the inlay pad is joined to the panel via the support element.

14. The panel according to claim 11, further comprising at least one welding dome that is used to mate the inlay pad to the support.

15. The panel according to claim 11, further comprising locking hooks that are used to mate the inlay pad to the support.

16. The panel according to claim 11, further comprising a sensor and/or an actuator for a comfort setting.

17. A method for forming a panel for a vehicle interior, the method comprising:
providing a relatively non-deformable support defining a first portion of a vehicle interior side of the panel, the support being preformed with a shaped recess portion defining a footprint, the shaped recess portion including a recess at least at one edge region of the shaped recess portion;
forming a relatively deformable inlay pad into a shape and size that correspond to the footprint of the shaped recess portion, the inlay pad defining a second portion of the vehicle interior side of the panel, other than the first portion, the inlay pad including a foam pad, a decoration layer and an offset, the decoration layer overlying a first surface of the foam pad and the offset being located below a second surface of the foam pad opposite the first surface; and then
mounting the deformable inlay pad into the shaped recess portion to substantially occupy the shaped recess portion with the deformable inlay pad itself to form the panel and with the first and second portions of the panel visible from the vehicle interior side, the recess accommodating the offset.

18. The method according to claim 17, wherein the support is coated with a sheet before the inlay pad is mounted thereto.

19. The method according to claim 17, wherein the shaped recess portion is formed in the support by rear-injecting or rear-embossing.

20. The method according to claim 17, further comprising:
coating the inlay pad with a decoration after mounting the inlay pad into the shaped recess portion.

21. The method according to claim 17, wherein mounting the inlay pad into the shaped recess portion comprises riveting, gluing, welding, securing with screws, and or securing with clips.

22. A panel for a vehicle interior, the panel comprising:
a non-deformable support, the support defining a first portion of a vehicle interior side of the panel and a recessed pad mounting surface defining a footprint, the recessed pad mounting surface being preformed with a recess at least at one edge region of the footprint; and
a pad, that is deformable relative to the support, defining a second portion of a vehicle interior side of the panel, other than the first portion, and that is fully formed prior to being mounted to the pad mounting surface, the pad itself having a size and shape that conform substantially to the footprint such that the recessed pad mounting surface is substantially occupied by the pad, the first portion of the panel visible from the vehicle interior side and the second portion of the panel visible from the vehicle interior side, the pad including a foam pad, a decoration layer and an offset, the decoration layer overlying a first layer of the foam pad to be visible from the vehicle interior side, the offset being located below a second surface of the foam pad opposite the first surface, the second surface being mounted to the recessed pad mounting surface with the recess accommodating the offset.

23. The panel according to claim 22, wherein the offset extends from the decoration layer.

24. The panel according to claim 22, wherein the offset results from a manufacturing inaccuracy during fabrication of the pad.

25. The panel according to claim 1, wherein the offset extends from the decoration layer.

26. The panel according to claim 1, wherein the offset results from a manufacturing inaccuracy during fabrication of the inlay pad.

27. The method according to claim 17, wherein the offset extends from the decoration layer.

28. The method according to claim 17, wherein the offset results from a manufacturing inaccuracy during fabrication of the inlay pad.

* * * * *